United States Patent
Rieder

(10) Patent No.: US 12,228,324 B2
(45) Date of Patent: Feb. 18, 2025

(54) METHOD AND SYSTEM FOR MANAGING THE PRODUCTION OF AN ARTIFICIAL SNOWMAKING PLANT

(71) Applicant: TECHNOALPIN HOLDING S.P.A., Bolzano (IT)

(72) Inventor: Walter Rieder, Bolzano (IT)

(73) Assignee: TECHNOALPIN HOLDING S.P.A., Bolzano (IT)

(*) Notice: Subject to any disclaimer, the term of this patent is extended or adjusted under 35 U.S.C. 154(b) by 830 days.

(21) Appl. No.: 17/285,418

(22) PCT Filed: Oct. 11, 2019

(86) PCT No.: PCT/IB2019/058683
§ 371 (c)(1),
(2) Date: Apr. 14, 2021

(87) PCT Pub. No.: WO2020/079546
PCT Pub. Date: Apr. 23, 2020

(65) Prior Publication Data
US 2022/0049888 A1    Feb. 17, 2022

(30) Foreign Application Priority Data
Oct. 15, 2018  (IT) .................. 102018000009453

(51) Int. Cl.
*F25C 3/04* (2006.01)
*G06Q 10/04* (2023.01)

(52) U.S. Cl.
CPC .............. *F25C 3/04* (2013.01); *G06Q 10/04* (2013.01)

(58) Field of Classification Search
CPC .................................. F25C 3/04; G06Q 10/04
(Continued)

(56) References Cited

U.S. PATENT DOCUMENTS 5,400,965 A * 3/1995 Ratnik ............... F25C 3/04
                                              239/14.2
6,554,200 B1 * 4/2003 Satonaka ............ F25C 3/04
                                              239/69

(Continued)

FOREIGN PATENT DOCUMENTS

EP    2713119 A1     4/2014
EP    3280961 A1 *   2/2018   ............... F25C 3/04

OTHER PUBLICATIONS

H. Jain and R. Jain, "Big data in weather forecasting: Applications and challenges," 2017 International Conference on Big Data Analytics and Computational Intelligence (ICBDAC), Chirala, Andhra Pradesh, India, 2017, pp. 138-142, doi: 10.1109/ICBDACI.2017.8070824. (Year: 2017).*

(Continued)

Primary Examiner — Sun M Li
(74) Attorney, Agent, or Firm — Workman Nydegger

(57) ABSTRACT

A method for managing the production of an artificial snowmaking plant having a plurality of snowmaking apparatuses arranged along a ski slope, comprising the operating steps of:
  comparing historical forecast values ($V_{SP}$) of a parameter with respective one or more historical values of the realistically measured weather parameter ($V_{SR1,2,3}$) at said one or more snowmaking apparatuses arranged in said predefined geographical area;
  determining future forecast values ($V_{FP}$) of said parameter as a function of a historical difference value ($D_{1,2,3}$) determined at one or more apparatuses so as to determine one or more realistic future forecast parameter values ($V_{FR1,2,3}$) at each snowmaking apparatus on which the historical difference value ($D_{1,2,3}$) has been determined.

21 Claims, 4 Drawing Sheets

(58) Field of Classification Search
USPC .................................................. 239/14.2
See application file for complete search history.

(56) References Cited

U.S. PATENT DOCUMENTS

| | | | | |
|---|---|---|---|---|
| 7,290,722 | B1* | 11/2007 | Ewald | F25C 3/04 |
| | | | | 239/296 |
| 2002/0116122 | A1* | 8/2002 | Satonaka | F25C 3/04 |
| | | | | 342/357.57 |
| 2009/0140069 | A1* | 6/2009 | Landreau | F25C 3/04 |
| | | | | 239/14.2 |
| 2016/0290699 | A1* | 10/2016 | Dodson | F25C 3/04 |

OTHER PUBLICATIONS

K. Elevant and M. Turpeinen, "Improving Weather and Climatic Information Quality with User-Generated Observations," 2011 44th Hawaii International Conference on System Sciences, Kauai, HI, USA, 2011, pp. 1-10, doi: 10.1109/HICSS.2011.238. (Year: 2011).*
N. P. Lakkakula, K. K. Reddy and M. P. Raja, "Remote Sensing of Snow Wrap Using Clustering and Wavelet Transform," 2014 8th Asia Modelling Symposium, Taipei, Taiwan, 2014, pp. 39-46, doi: 10.1109/AMS.2014.19. (Year: 2014).*
N. P. Lakkakula, K. K. Reddy and M. P. Raja, "Remote Sensing of Snow Wrap Using Clustering and Wavelet Transform," 2014 8th Asia Modelling Symposium, Taipei, Taiwan, 2014, pp. 39-46, doi: 10.1109/AMS.2014.19. (Year: 2014) (Year: 2014).*
Seasonal evolution of a ski slope under natural and artificial snow: detailed observations and modelling Pierre Spandre, Hugues François, Emmanuel Thibert, Samuel Morin, and Emmanuelle George-Marcelpoil.The Cryosphere Discuss., doi:10.5194/tc-2016-194, 2016. Published: Sep. 5, 2016 (Year: 2016).*
Snowfall induced by Corona Discharge Jingjing Ju, Tie-Jun Wang, Ruxin Li, Shengzhe Du, Haiyi Sun, Yonghong Liu,Ye Tian, Yafeng Bai,Yaoxiang Liu,Na Chen,Jingwei Wang,Cheng Wang,Jiansheng Liu, S. L. Chin, and Zhizhan Xu. Arxiv ID: 1607.05125 , Publication Date: Jul. 6, 2016 (Year: 2016).*
Anonymous, "Backstage Magazine", https://www.technoalpin.com/fileadmin/PDF/Prospekte/EN/backstage-2016-en.pdf Oct. 23, 2011 (Oct. 23, 2011), Retrieved from the Internet: URL:https://web.archive.org/web/20170411113829if_/https://www.technoalpin.com/fileadmin/PDF/Prospekte/EN/backstage-2016-en.pdf.
Anonymous, "liberty snowmaking control", https://www.technoalpin.com/fileadmin/PDF/Prospekte/EN/liberty-2016-en.pdf Apr. 2, 2014 (Apr. 2, 2014), Retrieved from the Internet: URL:https://web.archive.org/web/20170411113817if_/https://www.technoalpin.com/fileadmin/PDF/Prospekte/EN/liberty-2016-en.pdf.
Anonymous, "Model output statistics—Wikipedia", Sep. 20, 2018 (Sep. 20, 2018), Retrieved from the Internet: URL:https://en.wikipedia.org/w/index.php?title=Model_output_statistics&oldid=860481196 XP055557930 [retrieved on Feb. 18, 2019] pp. 1-2.
International Search Report and Written Opinion, ISA/EPO, from PCT/IB2019/058683 filed Oct. 11, 2019, mailed Feb. 5, 2020.
Written Opinion of the International Preliminary Examining Authority, IPEA/EPO, from PCT/IB2019/058683 filed Oct. 11, 2019, mailed Sep. 15, 2020.

* cited by examiner

METHOD AND SYSTEM FOR MANAGING THE PRODUCTION OF AN ARTIFICIAL SNOWMAKING PLANT

TECHNICAL FIELD

The present invention relates to a method and a system for managing and planning the production of an artificial snowmaking plant. In particular, the present invention falls within the field of software for managing snowmaking plants along which a plurality of snowmaking apparatuses are arranged, electrically connected to one another and governed by a central computer.

In greater detail, the present invention relates to the use of weather forecasts to plan the future production of a snowmaking plant.

STATE OF THE ART

As is well known, artificial snowmaking plants have considerable water and energy needs, without counting the fact that the production of artificial snow is limited by various external and internal factors.

There are usually very narrow time windows for producing artificial snow, which are fundamentally determined by the outdoor climate conditions (in particular the wet bulb temperature). In fact, many snowmaking apparatuses are equipped with sensors that continuously monitor the evolution of the climate conditions. The internal conditions for snow production are, for example, the availability of water and the capacity of the pumping stations of the plant. These limitations often preclude the simultaneous activation of all the snowmaking apparatuses of the plant.

Therefore, it is necessary to envisage that the plant be governed by specific management systems, more or less advanced, such as, for example, the one described in patent EP2713119 owned by the same applicant.

Said patent also generically describes the possibility of using weather forecasts to optimise the management of snowmaking apparatuses distributed along a ski run. In detail, when lower temperatures are forecast it is convenient to produce snow or vice versa.

An accurate forecast of the possible production of artificial snow has an enormous impact on management, since it makes it possible, for example, to optimise the production of artificial snow with respect to energy and water consumption and, for example, to plan the date on which a ski resort will be opened to the public, which is of interest not only to the operator of the resort, but also to many sectors of the local economy.

However, at present, weather forecast data coming from weather stations in or in the vicinity of the skiing area are used to plan snow production. Such weather stations enable one to have a "generic" forecast of the temperatures within a large area that covers a number of snowmaking apparatuses.

Therefore, even an exact weather forecast for one position in the skiing district can prove to be useless for planning the production of the entire plant, since the climate conditions might allow artificial snow to be produced only in a small fraction of the district. In other words, having only a weather forecast for several positions in the resort does not enable a production program to be planned for every individual apparatus of the plant.

OBJECTS OF THE INVENTION

In this situation, the object of the present invention is to provide a method and a system for managing the production of an artificial snowmaking plant which remedies the aforementioned drawbacks.

In particular, it is an object of the present invention to provide a method and a system for managing the production of an artificial snowmaking plant which makes it possible to optimise the production of artificial snow with respect to energy and water consumption.

It is a further object of the present invention to provide a method and a system for managing the production of an artificial snowmaking plant which makes it possible to more precisely ascertain the public opening times of a ski resort.

The specified objects are substantially achieved by a method and a system for managing the production of an artificial snowmaking plant according to what is disclosed in the appended claims.

BRIEF DESCRIPTION OF THE FIGURES

Additional features and advantages of the present invention will become more apparent from the detailed description of a preferred, but non-exclusive, embodiment of a method and a system for managing the production of an artificial snowmaking plant illustrated in the appended drawings, in which.

Figure 1:
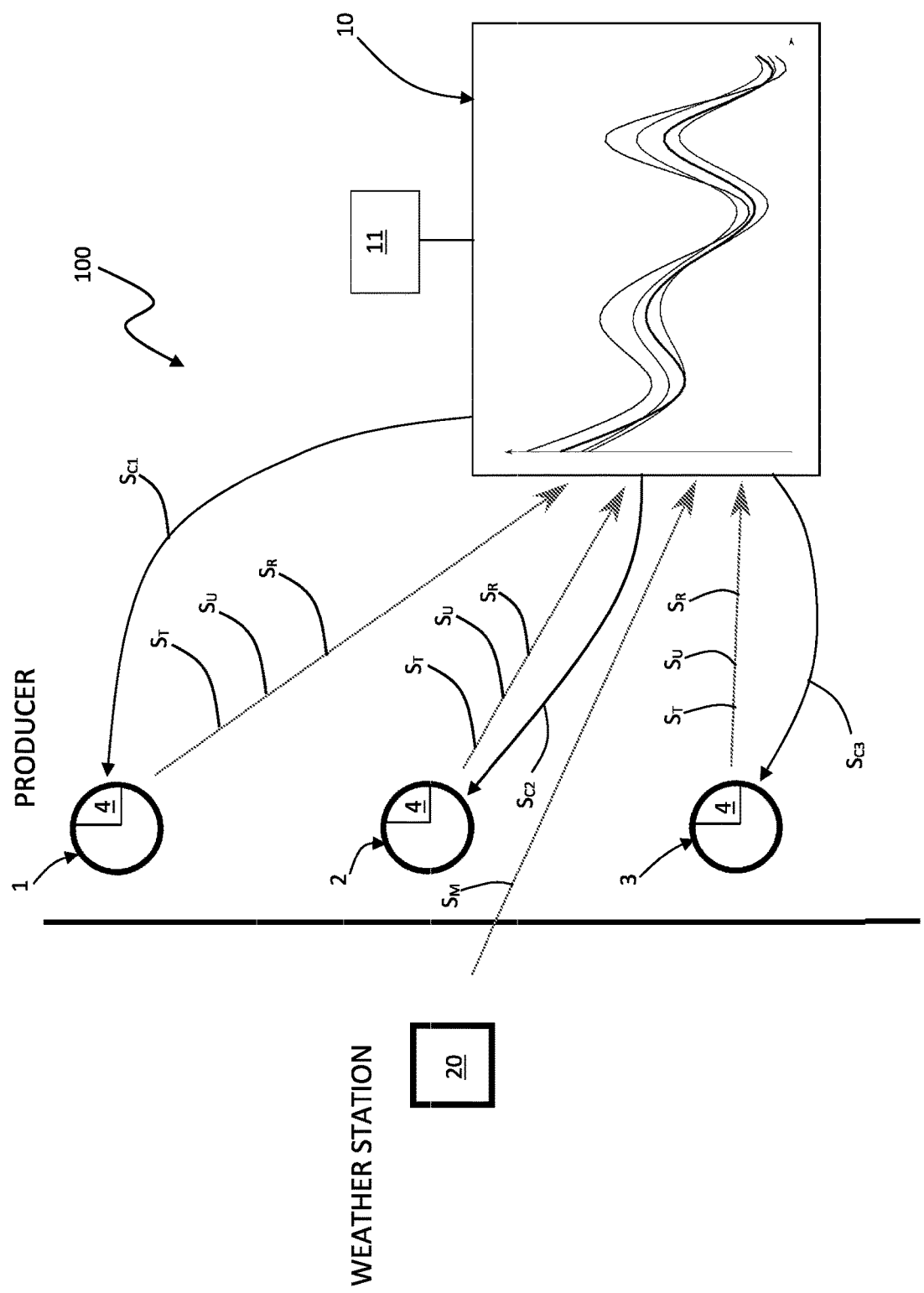
FIG. 1 shows a schematic view of the system for managing the production of an artificial snowmaking plant according to the present invention.

With reference to the aforementioned figures, the reference number 100 denotes in its entirety a snowmaking plant on which the planning method and system according to the present invention acts.

In particular, the artificial snowmaking plant 100 comprises a plurality of snowmaking apparatuses 1, 2, 3 arranged along a ski slope and connected to a common line of communication.

In particular, each snowmaking apparatus 1, 2, 3 comprises a snowmaking device (for example a "snow cannon" or a "snow gun") and a respective supply member (commonly called a "reservoir") for supplying a snowmaking liquid connected to the snowmaking device. Each supply member is connected to one or more snowmaking devices by means of conduits in which the snowmaking liquid flows.

In particular, the snowmaking device is positioned in proximity to a respective snowmaking liquid supply member and covers a predetermined geographical snowmaking area of the slope.

The control system comprises a control unit 10 connected to the various snowmaking apparatuses 1, 2, 3 by means of said line of communication.

At least one apparatus 1, 2, 3 comprises at least one temperature sensor 4 configured to detect the temperature at the apparatus 1, 2, 3 itself and to send a temperature signal $S_T$ to the control unit 10. In particular, the temperature sensor 4 could be present on all of the apparatuses 1, 2, 3 or only some of them.

In addition, at least one apparatus 1, 2, 3 also comprises other sensors, such as, for example, a humidity sensor configured to detect the humidity at the apparatus 1, 2, 3 itself and to send a humidity signal $S_U$ to the control unit 10.

Furthermore, the apparatus 1, 2, 3 can comprise a means for detecting the pressure and flow rate of water supplied to the snowmaking device. The detection means is configured to send a water pressure and flow rate detection signal $S_R$ to the control unit 10.

In other words, the control unit 10 is configured to receive:

1. the temperature signal $S_T$; and/or
2. the humidity signal $S_U$; and/or
3. the water pressure and flow rate detection signal $S_R$.

Furthermore, the control unit 10 is configured to send to each apparatus 1, 2, 3 a control signal $S_{C1,2,3}$ for managing the water and compressed air supply means so as to manage the production of snow based on the atmospheric conditions of the slope.

In addition, the control unit 10 is configured to receive a forecast signal $S_M$ of said parameter (preferably temperature and/or humidity) from one or more area weather stations and to manage the supply means based on the data contained in said forecast signal $S_M$.

Furthermore, the system comprises a historical memory 11 connected to the control unit 10 and containing historical data relating to past weather forecasts and the temperature and humidity values realistically measured in the past at each apparatus 1, 2, 3. The historical memory 11 can be included in the control unit 10, or physically separated from it but electrically connected to it, for example a cloud type memory set up online.

In detail, the historical data comprise:

4. historical values of forecasts of a weather parameter (e.g. temperature or humidity) that were provided before a reference moment in time (for example real time) by at least one weather station in relation to a predefined geographical area of said slope;
5. historical values of the weather parameter that was realistically measured at said one or more snowmaking apparatuses 1, 2, 3 arranged in said predefined geographical area, for example by means of the sensors of the apparatus 1, 2, 3 itself.

It should be noted that the term "historical" or "historical values" means past values (preferably of past years) before a moment in the present time.

The term "future", by contrast, will indicate forecasts regarding future time (preferably days or months) following the present moment in time.

FIG. 1 schematically illustrates a snowmaking plant 100 to which the system according to the present invention has been applied.

In particular, the weather station is a station set up by third parties, which is preferably located in proximity to a slope, more or less near. The weather station is connected to the control unit 10 and sends to the latter a future forecast signal of the parameter of interest (for example temperature and humidity) in relation to a predefined geographical area of the slope. The predefined geographical area covers at least part of the slope and thus at least part of the snowmaking apparatus 1, 2, 3 installed there.

The weather station can also be used to memorise past weather forecasts in relation to a certain area and send such data to the control unit 10 for defined historical forecast values of a weather parameter $V_{SP}$.

Alternatively, the historical forecast values of a weather parameter $V_{SP}$ are stored locally in the above-mentioned historical memory.

Hereinafter, the following terminology will be used to indicate the forecast values and the realistically measured values:

6. "historical forecast values of a weather parameter $V_{SP}$", which indicate the weather forecast values provided by the weather station relating to the past;
7. "historical values of the realistically measured weather parameter $V_{SR1,2,3}$", which indicate the historical values of the parameter that was realistically measured at the snowmaking apparatuses 1, 2, 3;
8. "historical difference value $D_{1,2,3}$", which indicates the difference between the historical forecasts and the realistically measured values in relation to every single apparatus 1, 2, 3;
9. "future forecast values $V_{FP}$", which indicate the weather forecast values provided by the weather station relating to the future;
10. "realistic future forecast parameter values $V_{FR1,2,3}$", which indicate the future weather forecasts of the parameter realistically forecast for the future days or months.

Said weather parameter is preferably the atmospheric temperature at the snowmaking apparatus 1, 2, 3. Even more preferably, said parameter is the wet bulb temperature.

However, alternatively, the weather parameter could be humidity or another parameter not expressly specified here, or else a combination of several parameters.

In accordance with the present invention, the control unit 10 is configured to perform the following operations, which substantially correspond to the steps of the method:

providing the historical values of the realistically measured weather parameter $V_{SR1,2,3}$ that were forecast before a reference moment in time by at least one weather station 20 in relation to a predefined geographical area of said slope;

comparing said historical forecast values $V_{SP}$ of said parameter with respective one or more historical values of the realistically measured weather parameter $V_{SR1,2,3}$ at said one or more snowmaking apparatuses 1, 2, 3 arranged in said predefined geographical area;

determining a historical difference value $D_{1,2,3}$ for each snowmaking apparatus 1, 2, 3 for predefined moments or periods of time corresponding to moments or periods of time of said historical forecast values, wherein said historical difference value $D_{1,2,3}$ is representative of the difference between a historical forecast value $V_{SP}$ of said parameter and a corresponding historical value of said realistically measured parameter $V_{SR1,2,3}$ at said snowmaking apparatus 1, 2, 3;

detecting one or more future forecast values $V_{FP}$ of said weather parameter forecast following said reference moment in time by a weather station 20 in relation to said predefined geographical area of said slope;

correcting said future forecast values $V_{FP}$ of said parameter as a function of said historical difference value $D_{1,2,3}$ determined at one or more apparatuses 1, 2, 3 so as to determine one or more realistic future forecast parameter values $V_{FR1,2,3}$ at each snowmaking apparatus 1, 2, 3 on which the historical difference value $D_{1,2,3}$ has been determined;

supplying each snowmaking apparatus 1, 2, 3 with a respective amount of snowmaking liquid suitable for producing artificial snow as a function of said one or more realistic future forecast parameter values $V_{FR1,2,3}$ that have been determined at each apparatus 1, 2, 3.

It should be noted that one or more of said steps can be performed by the control unit 10 in the cloud (not necessarily on the plant). In particular, the calculation of the temperature forecast and/or production forecast model can be performed in the cloud. In other words, the control unit can be at least in part implemented in the cloud so as to perform at least part of the above-mentioned steps.

The correction step preferably comprises at least one step of adding or subtracting said historical difference value $D_{1,2,3}$ to or from the future forecast value $V_{FP}$ of said parameter.

Figure 2:
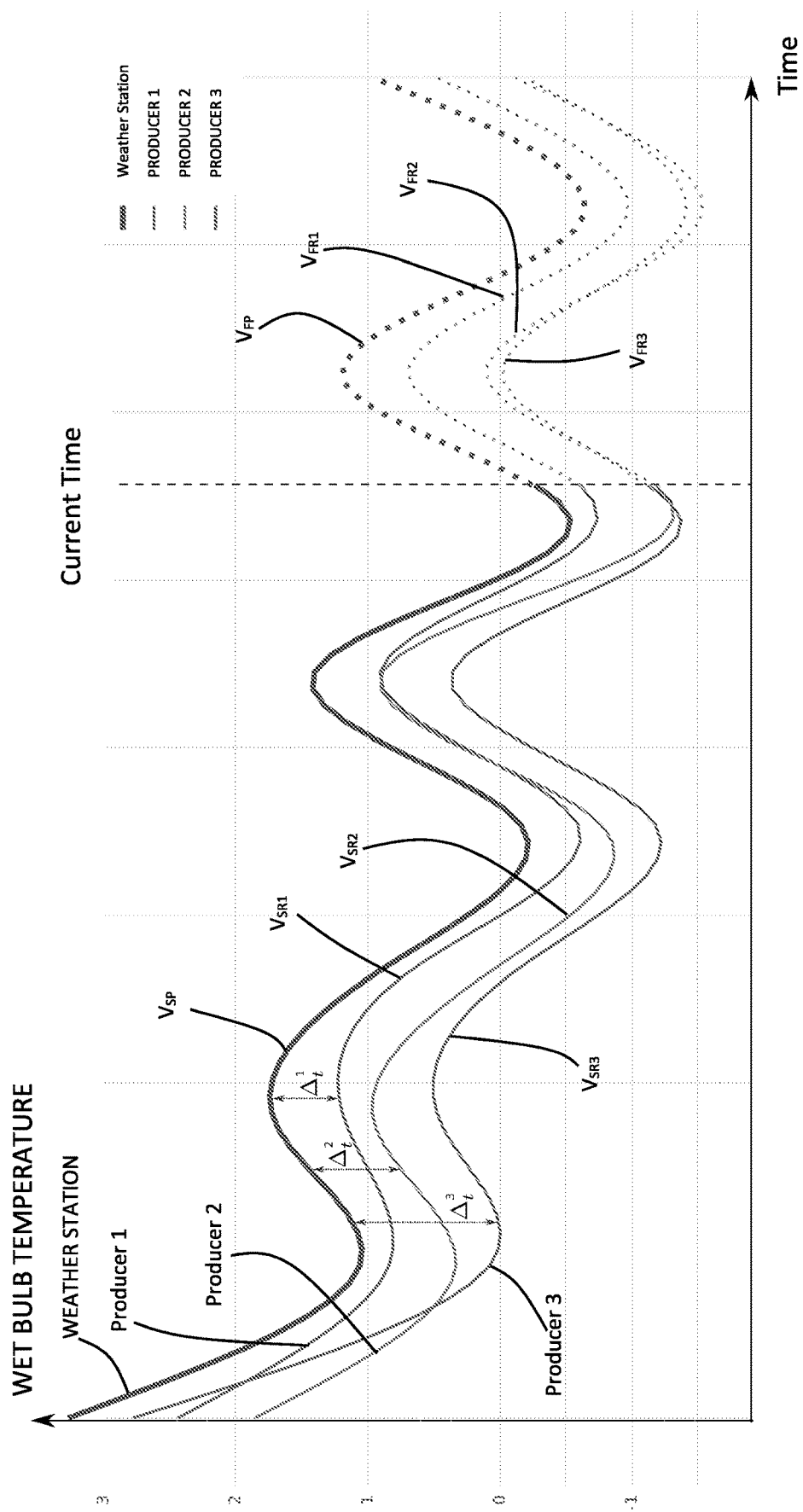
FIG. 2 shows a schematic view of a graph of historical (continuous lines) and future (dotted lines) temperature values for managing production.

In particular, observing FIG. 2 it is possible to see a graph in which several curves of temperature trends over time are represented. The continuous curves represent the historical values, whereas the broken curves represent the future forecast values $V_{FP}$. The two types of curves are separated by a vertical line which represents a reference moment in time, preferably the present time.

As regards the historical value part, the thickest curve represents the past trend in the historical forecast temperature values $V_{SP}$, whilst the thinner curves represent the trend in the historical values of the realistically measured temperature $V_{SR1,2,3}$ at three snowmaking apparatuses 1, 2, 3 (schematically represented with circles in FIG. 1).

The historical difference value $D_{1,2,3}$ indicated in FIG. 2 indicates the temperature difference present between the area forecast and the real temperature $V_{SR1,2,3}$ measured at the apparatus 1, 2, 3.

In fact, whereas the weather forecasts provided by the weather station 20 usually regard a large area, with the present invention it is advantageously possible to know the temperature difference in the specific area in which each apparatus 1, 2, 3 is located.

Again observing FIG. 2, following the present moment in time, the thickest dotted line indicates the future forecast temperature values $V_{FP}$ provided by the weather station 20, whereas the other thinner dotted lines correspond to the real temperature forecasts $V_{FR1,2,3}$ for the same period of the year.

Therefore, the step of correcting said future forecast values $V_{FP}$ of said parameter as a function of said historical difference value $D_{1,2,3}$ determined at one or more apparatuses 1, 2, 3 comprises adding or subtracting the historical difference value $D_{1,2,3}$ corresponding to an analogous time period of one or more previous years.

The method according to the present invention envisages creating a model of realistic future forecasts of the parameter for each apparatus 1, 2, 3 as a function of said historical difference values.

Furthermore, the control unit 10 is configured to supply the snowmaking liquid and/or compressed air as a function of the real temperature forecasts $V_{FR1,2,3}$ at each apparatus (reservoir). In other words, the control unit 10 governs the water and/or compressed air supply means as a function of the real temperature forecasts $V_{FR1,2,3}$. In this manner, it is possible to optimise the consumption of water and electricity according to the snow to be produced.

In detail, the control unit 10 is configured to detect a historical snow production value $V_{PS}$ relating to one or more apparatuses 1, 2, 3 at a given moment or period of time at a historical value of the realistically measured parameter $V_{SR1,2,3}$. The historical snow production value $V_{PS}$ is tied to the amount of water that was supplied to an apparatus 1, 2, 3 on a certain date in the past and for a certain temperature in the past.

Therefore, the control unit 10 is configured to predict and calculate a future snow production value $V_{PF1,2,3}$ relating to one or more apparatuses 1, 2, 3 at which a realistic future forecast temperature value $V_{FR1,2,3}$ that is equal or similar to the realistically measured historical temperature value $V_{SR1,2,3}$ is provided.

In other words, by knowing the amount of snow (from the liquid supplied) produced in the past by a certain apparatus 1, 2, 3 and at a certain realistically measured historical temperature value $V_{SR1,2,3}$, it is possible to calculate the amount of snow $V_{PF1,2,3}$ that will be produced in the future by the same apparatus 1, 2, 3 for a realistic temperature forecast value $V_{FR1,2,3}$.

The control unit 10 is therefore configured to send a control signal $S_{C1,2,3}$ to each apparatus 1, 2, 3 for the supply of an amount of snowmaking liquid corresponding to the historical snow production value $V_{PS}$ detected for a same forecast temperature.

Therefore, the control unit 10 generates a model of snow production for the future as a function of the future forecast temperatures and the historical snow production.

In other words, the control unit 10 is configured to calculate snowmaking time windows as a function of:
  future snow production value $V_{PF1,2,3}$ calculated in relation to one or more apparatuses 1, 2, 3;
  realistic future forecast parameter values $V_{FR1,2,3}$ calculated in relation to one or more apparatuses.

Therefore, the calculated snowmaking time windows make it possible to plan the production of snow for the future (at least for the upcoming days).

It should be further noted that the method comprises managing the production of snow based on characteristics of the plant (not only of the amount of water able to reach the reservoir) such as, for example, the production capacity of the machine room, the maximum capacity of the electric power lines and/or other characteristics of the plant not expressly mentioned here.

In other words, the control unit 10 is configured to receive data relating to the characteristics and limits of the snowmaking plant (and also of the snowmaking apparatuses 1, 2, 3 making it up) and to plan future snow production taking into account the characteristics and limits of the plant (for example, it might be possible to have an estimated production that is greater than the plant capacity or vice versa).

Figure 4:
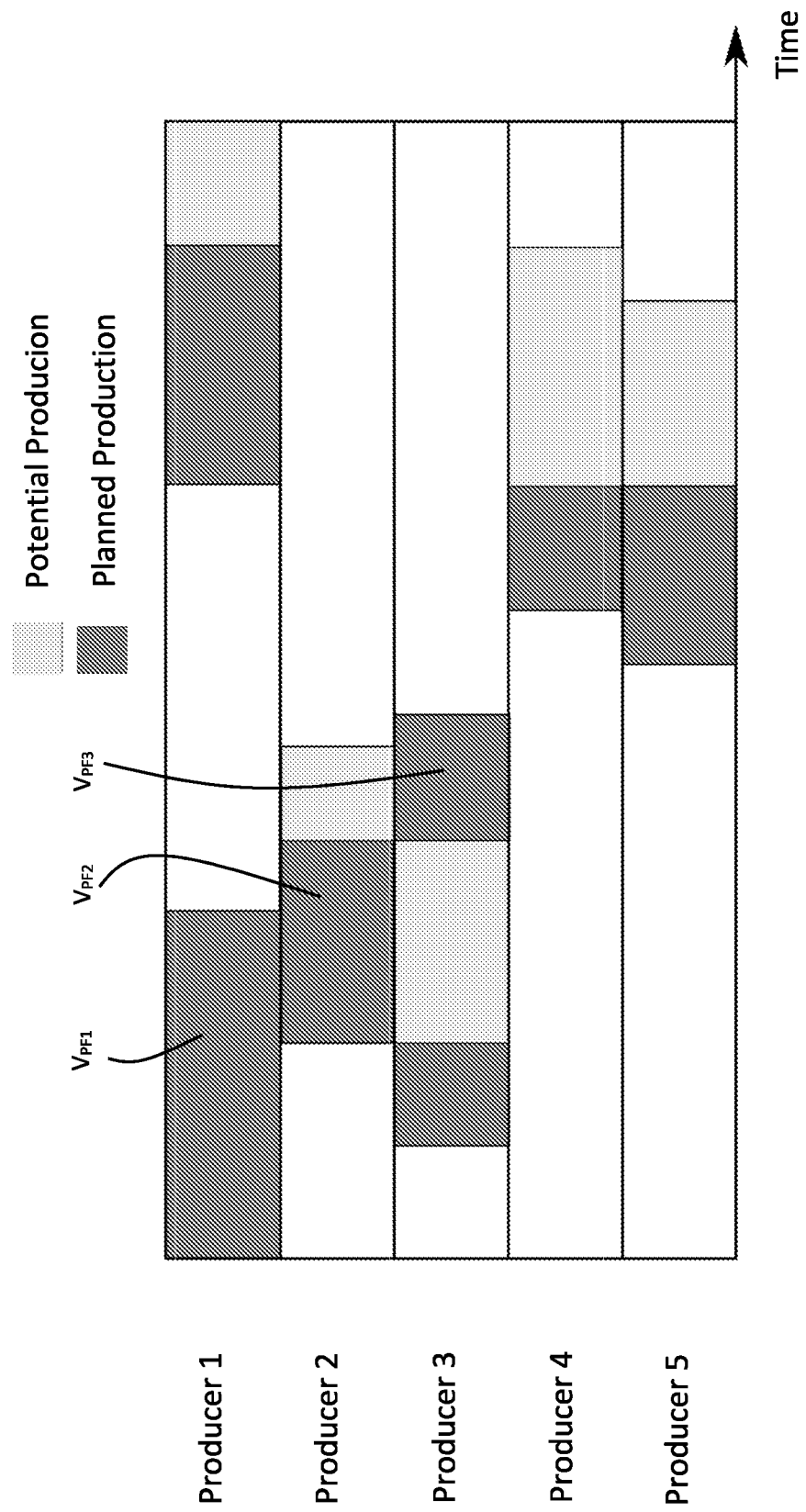
FIG. 4 shows a schematic view of a production table provided by the management system and method according to the present invention.

FIG. 4 shows a diagram of production planning over time for various snowmaking apparatuses 1, 2, 3, wherein it is possible to note that the planned production varies depending on the apparatus 1, 2, 3 concerned.

In fact, every apparatus 1, 2, 3 is subject to different future temperature forecasts depending on the area it is located in.

According to another aspect of the present invention, the steps of providing historical forecast parameter values $V_{SP}$ and comparing said historical forecast values of said parameter with respective one or more realistically measured historical parameter values $V_{SR1,2,3}$, envisage that said historical forecast and realistically measured values relate to one or more snowmaking plants other than the plant 100 for which the steps of detecting one or more future forecast values $V_{FP}$ of values of said parameter and correcting them are carried out.

In other words, the control unit 10 envisages using data coming from other plants in order to be able to recognise similar temperature and snow production situations. In detail, the control unit 10 is configured to:

compare the data of realistically detected historical temperature values $V_{SR1,2,3}$ in a first plant 100 with realistically detected historical temperature values in a second plant 100;

compare the historical production data $V_{PS1,2,3}$ of an apparatus 1, 2, 3 of the first plant 100 with the historical production data of an apparatus 1, 2, 3 of the second plant at the same realistically detected temperature;

correct the future production values $V_{PF1,2,3}$ foreseen for the apparatus 1, 2, 3 of the first plant 100 on the basis of that comparison.

Therefore, the system and method according to the present invention make it possible to also take into consideration similar information belonging to a second plant with apparatuses 1, 2, 3 in weather conditions similar to those of the apparatuses 1, 2, 3 of the first plant 100.

The subject matter of the present invention further relates to a computer program for managing the production of an artificial snowmaking plant 100, which is configured to execute the instructions according to the previously described steps of the method.

Figure 3:
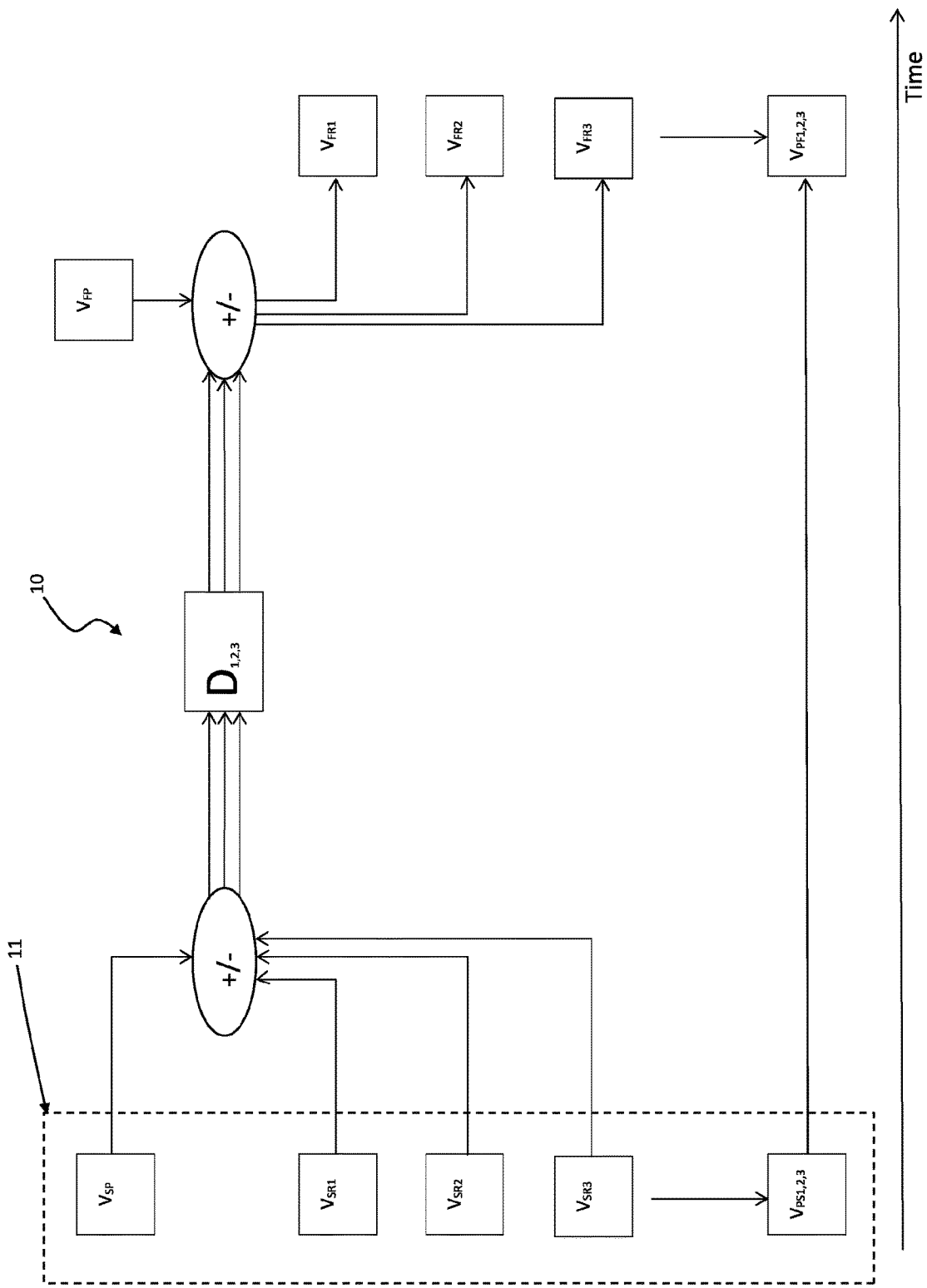
FIG. 3 shows a schematic view of a block diagram of the main steps of the method according to the present invention.

FIG. 3 schematically summarises the operation of the system and method according to the present invention. In particular, the historical temperature and production values are represented on the left side, whereas the future temperature and production values VFP forecast based on a comparison with realistically measured historical data such as temperature and water are represented on the right side.

It should be noted that the management of production according to the present invention is specific for every apparatus 1, 2, 3 and not generic for an area (as was the case in the prior art), since the weather forecasts of one area are compared by the system with historical, real temperature values detected by every specific snowmaking apparatus 1, 2, 3.

The present invention achieves the set aims.

In particular, the invention achieves the object of reducing uncertainty in managing the production of artificial snow. This is obtained by combining the knowledge about the plant 100 acquired in previous years with an accurate weather forecast on a reduced scale for every single snowmaker of the plant 100. This specific forecast is based on one or more weather forecasts for the positions in or in the vicinity of the skiing district, as well as measurement data that are measured over time by the sensors of the snowmaking apparatuses 1, 2, 3.

One of the advantages of the invention is that it enables the possible production time windows in the upcoming days to be calculated for every single snowmaker of the plant 100. In this manner it is possible to calculate an hourly production programme at the level of single components which takes account of all the internal limitations of the plant 100 and the external (forecast) limitations. Furthermore, managing production for every component of the plant 100 enables an accurate forecast of water and energy consumption, and thus enables production to be optimised with respect to water or energy consumption.

A further advantage of the invention is that having a production plan for every single component of the plant 100 makes it possible to obtain a more accurate assessment of the current production status (compared to the seasonal objective) than when a comparison is only made between the current production status and the production of the previous year.

Finally, the invention makes it possible to take into consideration the replacement or addition of components for assessing the current production status. That is, if a component/apparatus 1, 2, 3 is replaced by a more recent model, the greater production capacity and efficiency can be taken into consideration in the planning.

It should further be noted that the present invention is relatively easy to implement and also that the cost for implementation of the invention is not very high.

The invention claimed is:

1. A method for causing a system to manage an artificial snowmaking plant having a plurality of snowmaking apparatuses arranged along a ski slope, said method further facilitating a determination as to how much snow is to be produced by the artificial snowmaking plant and, based on that determination, optimizing an amount of snowmaking liquid that is provided to the artificial snowmaking plant in order to produce the snow, the plurality of snowmaking apparatuses comprising corresponding sensors that collect weather measurement data used to forecast weather in a geographic area of the plurality of snowmaking apparatuses, said method being performed by the system and comprising:

providing historical forecast values of a realistically measured weather parameter that was forecast before a reference moment in time by at least one weather station in relation to a predefined geographical area of said ski slope, wherein the historical forecast values are measured using the sensors that collect the weather measurement data used to forecast the weather in geographic area;

comparing said historical forecast values with respective historical values of the realistically measured weather parameter at said plurality of snowmaking apparatuses, which are arranged in said predefined geographical area;

determining a historical difference value for each of the snowmaking apparatuses for predefined moments or periods of time corresponding to moments or periods of time of said historical forecast values, wherein each said historical difference value is representative of a difference between one of the historical forecast values and a corresponding one of the historical values;

detecting one or more future forecast values of said weather parameter, the one or more future forecast values being forecast for a time that is subsequent to said reference moment of time;

correcting said one or more future forecast values of said weather parameter as a function of said historical difference values so as to determine one or more realistic future forecast parameter values at each of the snowmaking apparatuses on which a corresponding historical difference value has been determined; and based on weather conditions detected at the snowmaking apparatuses, where the weather conditions are detected using the sensors, flowing the snowmaking liquid from one or more reservoirs through a set of conduits to the snowmaking apparatuses, resulting in supplying each of the snowmaking apparatuses with a respective amount of the snowmaking liquid suitable for producing artificial snow as a function of said one or more realistic future forecast parameter values that have been determined for each of the snowmaking apparatuses such that the respective amount of the snowmaking liquid is governed based on the function of the one or more realistic future forecast parameter values and such that each of the snowmaking apparatuses is activated, as a result of being supplied with a corresponding amount of snowmaking liquid, to produce artificial snow at a value that corresponds with a historical snow production value.

2. The method according to claim 1, characterized in that said correction step comprises at least one step of adding or subtracting said historical difference value to or from the future forecast value of said parameter.

3. The method according to claim 1, characterized in that said historical forecast values of said parameter and the historical values of said realistically measured parameter define respective curves of the parameter in the past.

4. The method according to claim 1, characterized in that said future forecast values of said parameter and said realistic future forecast parameter values define respective time curves of said parameter in the future.

5. The method according to claim 1, characterized in that it calculates respective values of the amount of snowmaking liquid to be supplied to each apparatus as a function of said one or more realistic future forecast parameter values.

6. The method according to claim 5, characterized in that it generates a model of snow production for the future as a function of said one or more realistic future forecast parameter values.

7. The method according to claim 1, characterized in that it comprises the following further steps:
detecting the historical snow production value relative to one or more apparatuses at a given moment or period of time at a historical value of the realistically measured parameter; and
predicting a future snow production value relative to one or more apparatuses at which a realistic future forecast parameter value is envisaged which is equal or similar to the historical value of the realistically measured parameter.

8. The method according to claim 7, wherein said historical and future snow production values are calculated as a function of a value of the flow rate of snowmaking liquid supplied at the apparatus.

9. The method according to claim 1, characterized in that it comprises a step of supplying an amount of snowmaking liquid corresponding to the historical snow production value detected for a future value of said realistically forecast parameter that is substantially equal to the realistically measured historical temperature value.

10. The method according to claim 1, characterized in that data relating to the characteristics and limits of the snowmaking plant is received and snow production for the future is planned taking into account the characteristics and limits of the plant.

11. The method according to claim 1, characterized in that the steps of providing historical forecast parameter values and of comparing said historical forecast values of said parameter with respective one or more realistically measured historical parameter values at said one or more snowmaking apparatuses envisage that said historical weather forecast values and realistically measured values are related to one or more snowmaking plants that are different from the plant for which the steps of detecting one or more future forecast values of values of said parameter and of correcting them are performed.

12. The method according to claim 1, characterized in that the step of detecting at least one historical value of the realistically measured parameter at said snowmaking apparatus is envisaged as performed through parameter detection of the sensors that are pre-installed on the apparatus.

13. The method according to claim 1, characterized in that said parameter is the atmospheric temperature at the snowmaking apparatus.

14. A system for managing a production of an artificial snowmaking plant having a plurality of snowmaking apparatuses arranged along a ski slope, said system facilitating a determination as to how much snow is to be produced by the artificial snowmaking plant and, based on that determination, optimizing an amount of snowmaking liquid that is provided to the artificial snowmaking plant in order to produce the snow, the plurality of snowmaking apparatuses comprising corresponding sensors that collect weather measurement data used to forecast weather in a geographic area of the plurality of snowmaking apparatuses, said system comprising a control unit in data connection with said snowmaking apparatuses and configured to:
receive a signal of historical forecast values of a realistically measured weather parameter that was forecast before a predetermined moment in time by at least one weather station in relation to a predefined geographical area of said ski slope, wherein the historical forecast values are measured using the sensors that collect the weather measurement data used to forecast the weather in the geographic area;
compare said historical forecast values with respective historical values of said realistically measured parameter and received by said plurality of snowmaking apparatuses, which are arranged in said predefined geographical area;
determine a historical difference value for each of the snowmaking apparatuses for predefined moments or periods of time corresponding to moments or periods of time of said historical forecast values, wherein each said historical difference value is representative of a difference between one of the historical forecast values and a corresponding one of the historical values;
receive one or more future forecast values of the weather parameter, the one or more future forecast values being forecast for a time that is subsequent to the predetermined moment in time;
correct said one or more future forecast values of the weather parameter as a function of said historical difference values so as to determine one or more realistic future forecast parameter values at each of the snowmaking apparatuses on which a corresponding historical difference value has been determined; and
based on weather conditions detected at the snowmaking apparatuses, where the weather conditions are detected using the sensors, flow the snowmaking liquid from one or more reservoirs through a set of conduits to the snowmaking apparatuses, resulting in supplying each of the snowmaking apparatuses to manage an amount of the snowmaking liquid that is supplied to each of the snowmaking apparatuses, said management being based on a function of said one or realistic future forecast parameter values that have been determined for each of the snowmaking apparatuses so as to manage a production of artificial snow such that the amount of the snowmaking liquid is governed based on the function of the one or more realistic future forecast parameter values and such that each of the snowmaking apparatuses is activated, as a result of being supplied with a corresponding amount of snowmaking liquid, to produce artificial snow at a value that corresponds with a historical snow production value.

15. The system according to claim 14, characterized in that said control unit is configured to calculate respective values of the amount of snowmaking liquid to be supplied to each apparatus as a function of said one or more realistic future forecast parameter values.

16. The system according to claim 14, characterized in that said control signal is representative of respective values of the amount of snowmaking liquid to be supplied to each apparatus calculated by the control unit.

17. The system according to claim 14, characterized in that the control unit is configured to generate a model of snow production for the future as a function of said one or more realistic future forecast parameter values.

18. The system according to claim 14, characterized in that the control unit is configured to:
   detect the historical snow production value relating to one or more apparatuses at a given moment or period of time at a historical value of the realistically measured parameter; and
   predict a future snow production value relative to one or more apparatuses at which a realistic future forecast parameter value is envisaged which is equal or similar to the historical value of the realistically measured parameter.

19. The system according to claim 18, characterized in that said historical and future snow production values are calculated as a function of a value of the flow rate of snowmaking liquid supplied at the apparatus.

20. The system according to claim 19, characterized in that said control unit is configured to supply an amount of snowmaking liquid corresponding to the historical snow production value detected for a future value of said realistically forecast parameter that is substantially equal to the realistically measured historical temperature value.

21. The system according to claim 14, characterized in that said control unit is configured to receive data relating to the characteristics and limits of the snowmaking plant and to plan snow production for the future taking into account the characteristics and limits of the plant.

* * * * *